(12) United States Patent
Yamashita

(10) Patent No.: US 10,894,311 B2
(45) Date of Patent: Jan. 19, 2021

(54) TOOL INCLUDING LOAD SENSOR

(71) Applicant: MAX CO., LTD., Tokyo (JP)

(72) Inventor: Michio Yamashita, Tokyo (JP)

(73) Assignee: MAX CO., LTD., Tokyo (JP)

( * ) Notice: Subject to any disclaimer, the term of this patent is extended or adjusted under 35 U.S.C. 154(b) by 229 days.

(21) Appl. No.: 15/354,360

(22) Filed: Nov. 17, 2016

(65) Prior Publication Data

US 2017/0144289 A1 May 25, 2017

(30) Foreign Application Priority Data

Nov. 20, 2015 (JP) ................................. 2015-228225
Nov. 20, 2015 (JP) ................................. 2015-228226

(51) Int. Cl.
| | |
|---|---|
| *B25F 5/00* | (2006.01) |
| *B25F 5/02* | (2006.01) |
| *H01H 9/06* | (2006.01) |
| *H01H 13/14* | (2006.01) |
| *H01H 13/08* | (2006.01) |
| *B25B 21/02* | (2006.01) |
| *G01L 1/22* | (2006.01) |

(52) U.S. Cl.
CPC ............. *B25F 5/001* (2013.01); *B25B 21/02* (2013.01); *B25F 5/00* (2013.01); *B25F 5/02* (2013.01); *G01L 1/22* (2013.01); *H01H 9/061* (2013.01); *H01H 13/08* (2013.01); *H01H 13/14* (2013.01)

(58) Field of Classification Search
CPC ........ H01H 13/14; H01H 13/08; H01H 9/061; H01H 13/06; B25F 5/00; B25F 5/001; B25F 5/02; B25B 21/02; G01L 1/22

USPC ....................................... 173/170; 73/862.23
See application file for complete search history.

(56) References Cited

U.S. PATENT DOCUMENTS

| | | | | | |
|---|---|---|---|---|---|
| 3,133,170 | A | * | 5/1964 | Nanninga | .............. H01H 13/06 200/406 |
| 4,273,682 | A | * | 6/1981 | Kanamori | ................ C08K 9/00 252/511 |
| 5,999,084 | A | * | 12/1999 | Armstrong | ........... H01C 10/106 200/516 |
| 6,661,332 | B1 | * | 12/2003 | Hsu | ........................ H01H 13/70 338/21 |

(Continued)

FOREIGN PATENT DOCUMENTS

| | | |
|---|---|---|
| CN | 101320644 B | 7/2011 |
| CN | 102343576 A | 2/2012 |

(Continued)

*Primary Examiner* — Thanh K Truong
*Assistant Examiner* — Katie L Gerth
(74) *Attorney, Agent, or Firm* — Rothwell, Figg, Ernst & Manbeck, P.C.

(57) ABSTRACT

A tool includes a switch and a handle. The switch is configured to cause an electric component to operate. The handle is held by a hand to manipulate the switch. The switch includes a switch manipulation part to be manipulated, a load sensor, a sealing cover and a preventing member. The load sensor is configured to receive a pressing force through the switch manipulation part. The sealing cover includes an elastic material which is deformable when receiving the pressing force through the switch manipulation part, and is configured to press the load sensor. The preventing member is configured to seal an internal space between the sealing cover and the load sensor, around the load sensor.

19 Claims, 13 Drawing Sheets

(56) References Cited

U.S. PATENT DOCUMENTS

| | | | |
|---|---|---|---|
| 6,749,028 B1* | 6/2004 | Chan | B25F 5/00 173/170 |
| 7,166,813 B2* | 1/2007 | Soma | H03K 17/975 200/341 |
| 8,178,808 B2 | 5/2012 | Strittmatter | |
| 8,523,845 B2 | 9/2013 | Ippisch | |
| 8,991,518 B2* | 3/2015 | Elsmark | B25B 21/00 173/213 |
| 9,087,663 B2* | 7/2015 | Los | H01H 13/807 |
| 2001/0003326 A1* | 6/2001 | Okada | H03K 17/975 200/516 |
| 2002/0079211 A1* | 6/2002 | Katayama | H01H 3/125 200/517 |
| 2004/0262139 A1 | 12/2004 | Ieda et al. | |
| 2006/0144603 A1* | 7/2006 | Arich | B25D 16/00 173/109 |
| 2007/0285393 A1* | 12/2007 | Ishakov | G06F 3/0238 345/168 |
| 2008/0296140 A1 | 12/2008 | Yoshihara et al. | |
| 2009/0103964 A1* | 4/2009 | Takagi | H01H 3/125 400/495 |
| 2010/0204685 A1 | 8/2010 | Ippisch | |
| 2011/0203821 A1* | 8/2011 | Puzio | B25B 23/0064 173/1 |
| 2012/0024555 A1 | 2/2012 | Sugiyama et al. | |
| 2012/0068633 A1* | 3/2012 | Watanabe | B25F 5/001 318/3 |
| 2012/0085562 A1 | 4/2012 | Elsmark | |
| 2012/0292068 A1* | 11/2012 | Velderman | B25F 5/00 173/170 |
| 2012/0314354 A1* | 12/2012 | Rayner | H04B 1/3888 361/679.01 |
| 2013/0249463 A1* | 9/2013 | Nishikimi | H01H 15/16 318/504 |
| 2013/0255981 A1 | 10/2013 | Noto et al. | |
| 2013/0299324 A1* | 11/2013 | Kanbayashi | H01H 9/04 200/302.1 |
| 2014/0008090 A1* | 1/2014 | Kokinelis | B25F 5/02 173/170 |
| 2014/0048400 A1* | 2/2014 | Malek | H01H 13/20 200/517 |
| 2014/0168924 A1 | 6/2014 | Kuo et al. | |
| 2014/0252881 A1* | 9/2014 | Dinh | H01H 13/06 307/125 |
| 2014/0252883 A1* | 9/2014 | Dinh | H01H 13/06 307/125 |
| 2015/0041295 A1* | 2/2015 | Inagaki | H01H 13/063 200/302.2 |
| 2016/0172129 A1* | 6/2016 | Zercoe | G06F 3/0202 200/5 A |
| 2016/0379775 A1* | 12/2016 | Leong | G06F 1/1662 200/5 A |
| 2017/0144289 A1 | 5/2017 | Yamashita | |

FOREIGN PATENT DOCUMENTS

| | | |
|---|---|---|
| CN | 103871764 A | 6/2014 |
| JP | 3050919 U | 8/1998 |
| JP | 2001-082007 A | 3/2001 |
| JP | 2001266695 A | 9/2001 |
| JP | 2004-327126 A | 11/2004 |
| JP | 2012-150916 A | 8/2012 |
| JP | 2013-202702 A | 10/2013 |
| JP | 2014-167926 A | 9/2014 |
| JP | 2015-035301 A | 2/2015 |
| JP | 2017-098046 A | 6/2017 |

* cited by examiner

TOOL INCLUDING LOAD SENSOR

CROSS-REFERENCE TO RELATED APPLICATION

This application is based on and claims priority under 35 USC119 from Japanese Patent Application Nos. P2015-228225 filed on Nov. 20, 2015, and 2015-228226 filed on Nov. 20, 2015.

TECHNICAL FIELD

The present invention relates to a tool having a switch for operating an electric component.

BACKGROUND

As known to those skilled in the art, an electric tool having a switch for operating an electric component such as a motor is equipped with a sliding type variable resistor so as to control a rotating speed of the motor. The switch having the sliding type variable resistor requires many strokes of a switch manipulation part referred to as a trigger, and a size of the switch is being increased.

Therefore, a related art has been proposed in which a semiconductor, a strain gauge or the like are employed, and a load sensor converting a load into a voltage is applied to a switch of an electric tool (for example, refer to JP-A-2013-202702). A conventional electric tool having the load sensor is configured such that an opening is formed at a position facing the load sensor attached to an inside of a grip, and the load sensor is pressed by a manipulation member formed in the opening.

Another related art has been proposed in which the conventional electric tool using such a load sensor in the switch is configured such that the manipulation member is composed of an elastic member having a shape conforming to that of the opening of the grip, and the opening is sealed by the manipulation member (for example, refer to JP-A-2013-202702).

The related art has been proposed in which the load sensor is pressed through a shaft protruding from an inner surface of the manipulation member, the shaft is made of an elastic material, and an opening through which the shaft passes is sealed (for example, refer to JP-A-2014-167926). Furthermore, a related art has been proposed in which the load sensor is sealed by a cover made of an elastic material, such as a rubber, to be protected (for example, refer to JP-U-3050919).

SUMMARY

In a configuration where a manipulation member is used to press a load sensor and an open opening is sealed by a grip, it is difficult to reliably seal a portion of the grip in which the load sensor is formed, and it is impossible to prevent foreign matter such as moisture or dust from entering.

In a configuration where a load sensor is sealed by a cover of an elastic material such as rubber, when the cover is pressed, a volume of an internal space between the cover and the load sensor is decreased. Since the internal space between the cover and the load sensor is not completely sealed, air may possibly leak from the internal space to an outside when the volume of the internal space of the cover is decreased and a pressure of the internal space is increased.

When air leaks from the internal space to the outside, the internal space has a negative pressure unless air is taken into the internal space when a pressing force is released from the cover and the cover is restored to its original shape by the elasticity of the cover. When the internal space has the negative pressure, it may be difficult to restore the cover to its original shape using elasticity.

The invention has been made keeping in mind the above problems occurring in the related art, and an object of the invention is to provide a tool that prevents foreign matter such as moisture or dust from entering into a load sensor.

Further, the invention has been made keeping in mind the above problems occurring in the related art, and another object of the invention is to provide a tool that reliably restores a cover sealing a load sensor to its original shape.

According to one aspect of the invention, a tool includes a switch and a handle. The switch is configured to cause an electric component to operate. The handle is held by a hand to manipulate the switch. The switch includes a switch manipulation part to be manipulated, a load sensor, a sealing cover and a preventing member. The load sensor is configured to receive a pressing force through the switch manipulation part. The sealing cover includes an elastic material which is deformable when receiving the pressing force through the switch manipulation part, and is configured to press the load sensor. The preventing member is configured to seal an internal space between the sealing cover and the load sensor, around the load sensor.

According to another aspect of the invention, a tool includes a switch and a handle. The switch is configured to cause an electric component to operate. The handle is held by a hand to manipulate the switch. The switch includes a switch manipulation part to be manipulated, a load sensor, a sealing cover and a relieving part. The load sensor is configured to receive a pressing force through the switch manipulation part. The sealing cover includes an elastic material which is deformed to press the load sensor when receiving the pressing force through the switch manipulation part and which is configured to be restored to an original shape thereof when the pressing force is released, and is configured to cover the load sensor. The relieving part is configured to relieve an increase in pressure of an internal space between the sealing cover and the load sensor as the sealing cover is deformed.

According to the invention, when the sealing cover is deformed by the pressing of the load sensor through the switch manipulation part and thus a volume of the internal space between the sealing cover and the load sensor is decreased, the increase in pressure of the internal space is relieved as air flows into the relieving part.

According to the invention, the load sensor is attached to the preventing member that prevents foreign matter from entering into the load sensor from the surroundings, and the internal space between the sealing cover and the load sensor is sealed.

According to the invention, the load sensor is attached to the preventing member, thus allowing the load sensor to have a waterproof and dustproof structure.

According to the invention, since an increase in pressure of an internal space is relieved by the deformation of a sealing cover, the leakage of the air from the internal space to an outside is suppressed. Thus, when a pressing force exerted by a switch manipulation part is released to thereby restore the sealing cover to its original shape by elasticity of the sealing cover, the internal space does not have a negative pressure and the sealing cover is reliably restored to its original shape by its elasticity.

DETAILED DESCRIPTION

Hereinafter, an electric tool will be described with reference to the accompanying drawings, as an example of an embodiment of a tool of the invention.

Configuration Example of Electric Tool According to Present Embodiment

Figure 1:
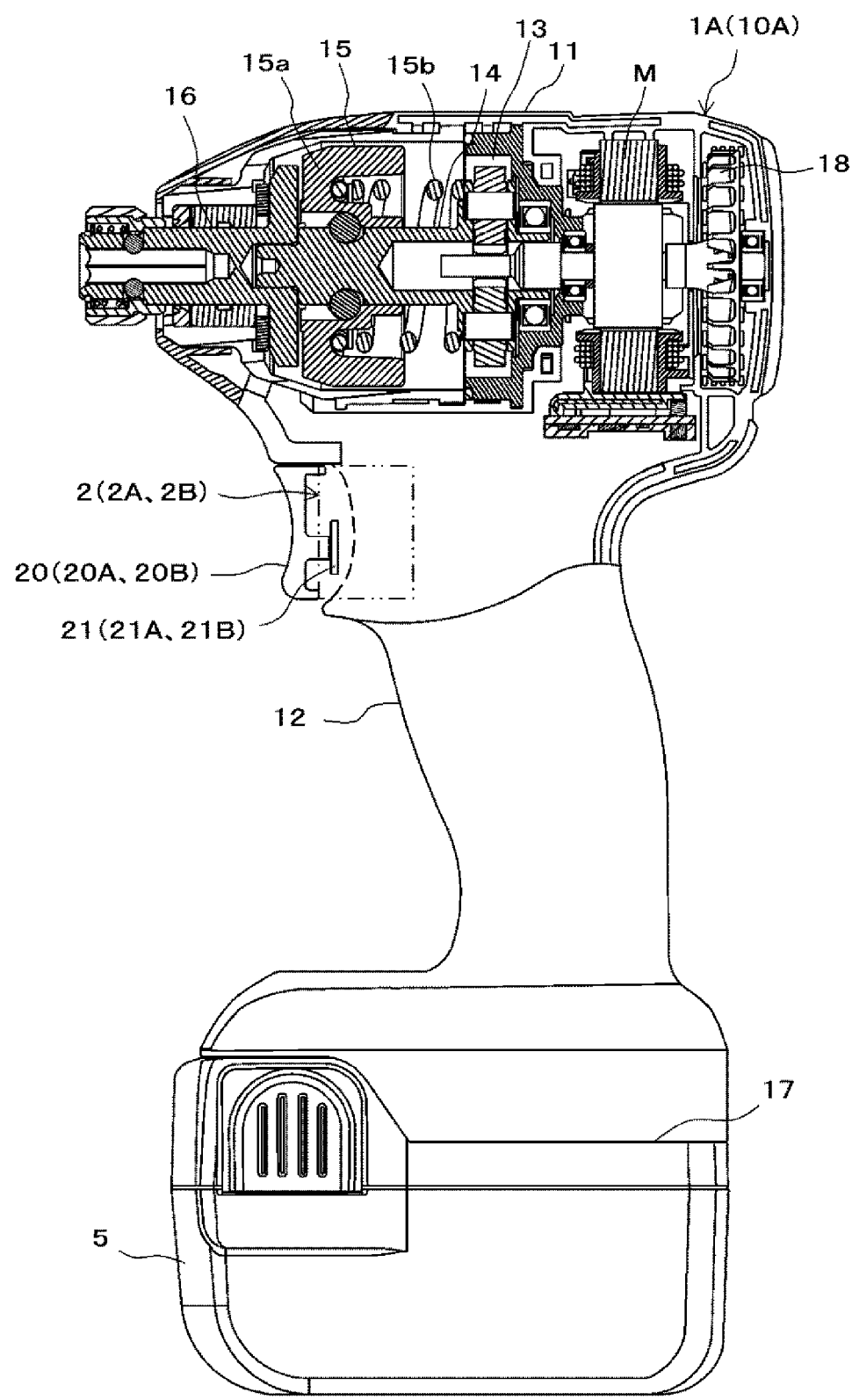
FIG. 1 is a view illustrating an overall configuration of an example of an electric tool according to the present embodiment.
Figure 2:
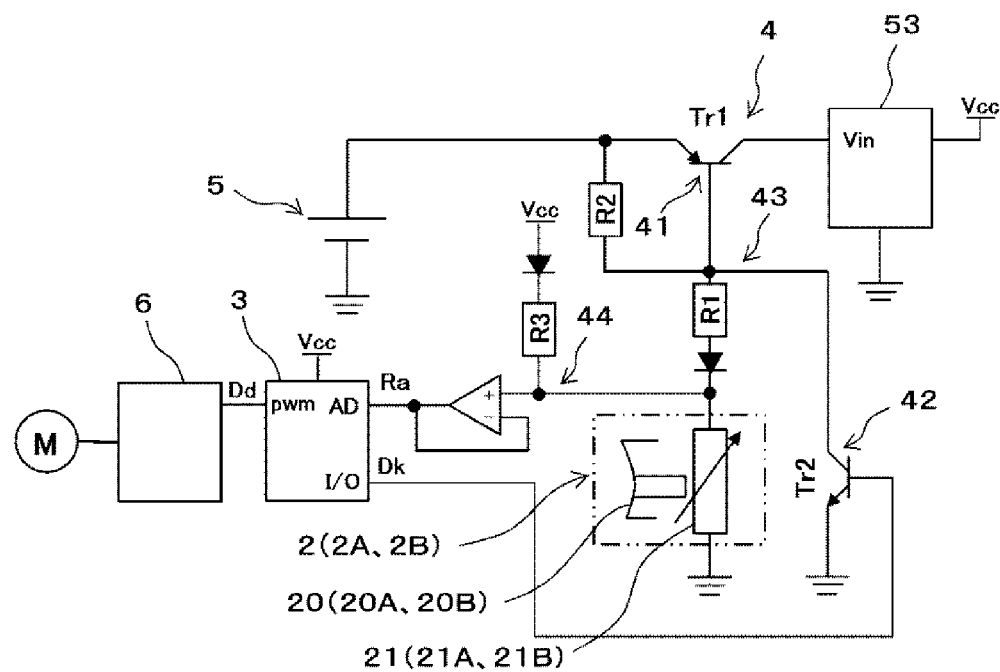
FIG. 2 is a block diagram illustrating an example of a circuit configuration of the electric tool according to the present embodiment.

FIG. 1 is a view illustrating an overall configuration of an example of an electric tool according to the present embodiment, and FIG. 2 is a block diagram illustrating an example of a circuit configuration of the electric tool according to the present embodiment.

An electric tool 1A of the present embodiment includes a switch 2 that operates a motor M as an electric component, a control unit 3 that controls the motor M by the manipulation of the switch 2, a control circuit 4 that starts the control unit 3 by the manipulation of the switch 2, and a power supply unit 5 that supplies power to the motor M, the control unit 3 and the like.

The electric tool 1A of the present embodiment is for example an impact driver 10A, and includes an electric-tool body 11 and a grip 12 as a handle equipped with the switch 2, as illustrated in FIG. 1. The impact driver 10A of the present embodiment as the electric tool 1A includes a spindle 14 to which the driving force of the motor M is transmitted through a reducer 13, an anvil 16 to which the rotation of the spindle 14 is transmitted through a hitting mechanism 15, and a fan 18 that cools the motor M or the like.

The motor M is an example of an electric machine, and is composed of a DC brushless motor in the present example. According to the present example, the reducer 13 includes a planet gear. Here, an input shaft and an output shaft of the reducer 13 are arranged on the same axis. Thus, the motor M and the spindle 14 are arranged on the same axis.

The hitting mechanism 15 includes a hammer 15a that gives a hitting force in a rotating direction to the anvil 16, and a compression spring 15b that biases the hammer 15a in a direction where it approaches the anvil 16. The hammer 15a is rotatably disposed on the same axis as the rotating shaft of the motor M.

The hitting mechanism 15 is operated as follows: when a load reaching or exceeding a predetermined level acts on the anvil 16, the hammer 15a is retreated while compressing the compression spring 15b, so that the anvil 16 temporarily disengages from the hammer 15a in the rotating direction, and thereafter the hammer 15a is advanced by the restoring force of the compression spring 15b, and simultaneously the hammer 15a hits the anvil 16 in the rotating direction.

The anvil 16 is rotatably supported on the same axis as the rotating shaft of the motor M, receives the driving force of the motor M through the spindle 14 and the hitting mechanism 15 to be rotated, and simultaneously is hit in the rotating direction by the hitting mechanism 15.

A bit, a socket or the like (not illustrated) is detachably attached to the anvil 16, so that a screw may be fastened to a fastened object while hitting in the rotating direction.

The impact driver 10A mounts the above-described motor M, reducer 13, spindle 14, hitting mechanism 15 and anvil 16 in the electric-tool body 11. The impact driver 10A is configured such that the electric-tool body 11 is formed on one side of the grip 12 and the power supply unit 5 is attached to the other side.

Since the power supply unit 5 referred to as a battery pack is detachably mounted on the impact driver 10A, a battery-pack attaching part 17 is provided on one end of the grip 12. The power supply unit 5 may be a rechargeable battery, for example, a lithium ion battery, a lithium ferrite battery, a lithium polymer battery, a nickel hydrogen battery, a nickel cadmium battery or the like.

Configuration Example of Switch According to First Embodiment

Figure 3:
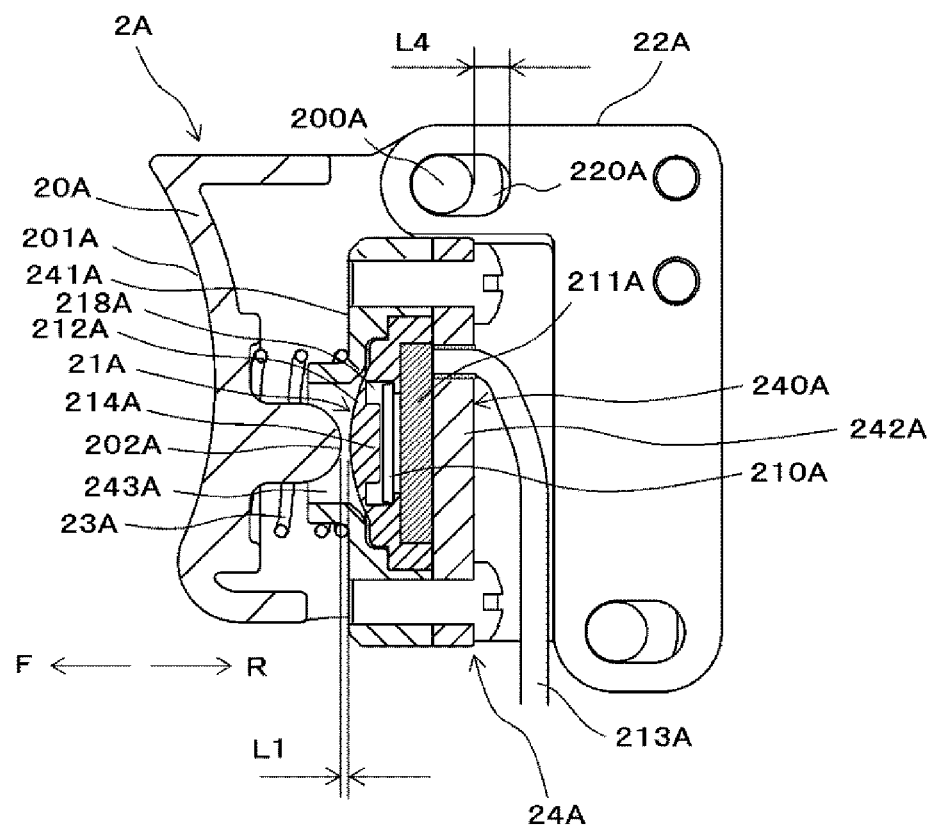
FIG. 3 is a view illustrating a configuration of an example of a switch according to a first embodiment.
Figure 4:
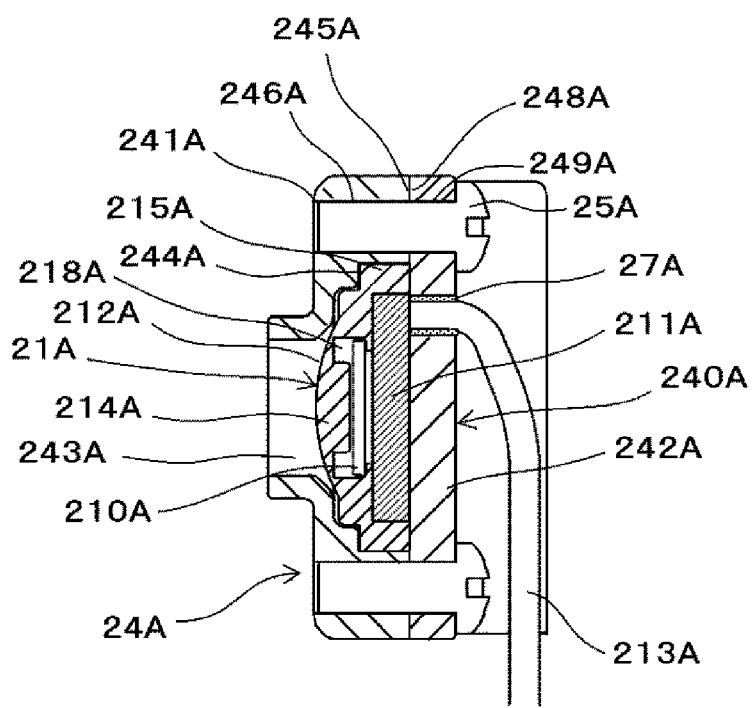
FIG. 4 is a view illustrating a configuration of an example of a sensor unit according to the first embodiment.
Figure 5:
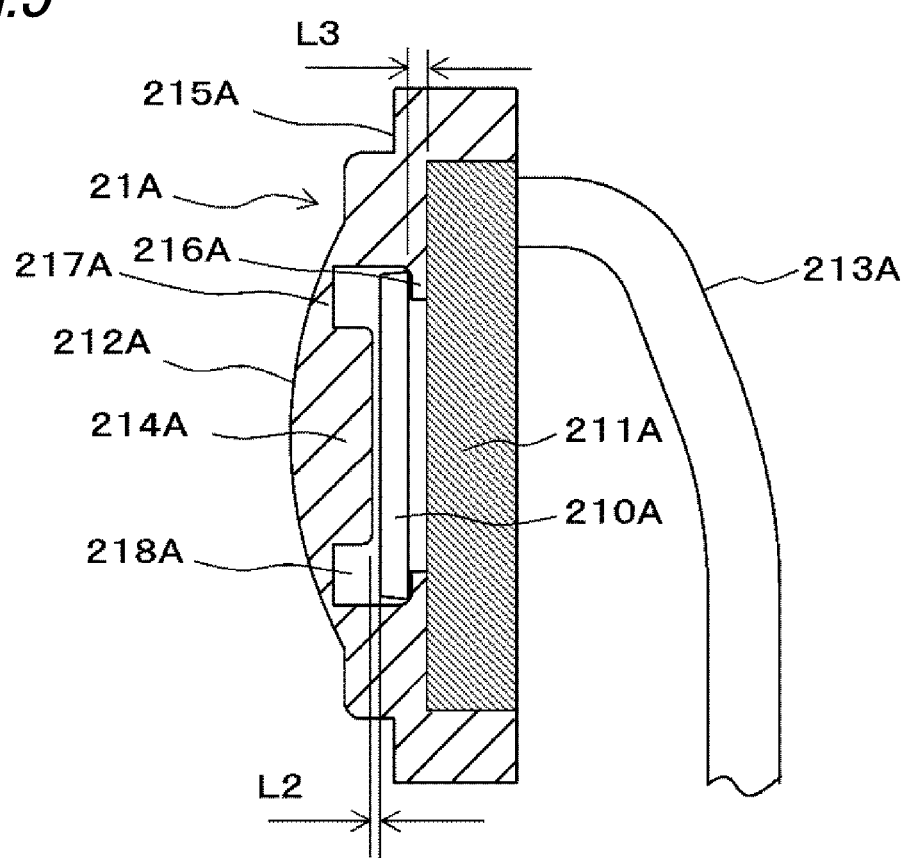
FIG. 5 is a view illustrating a configuration of an example of a load sensor according to the first embodiment.
Figure 6:
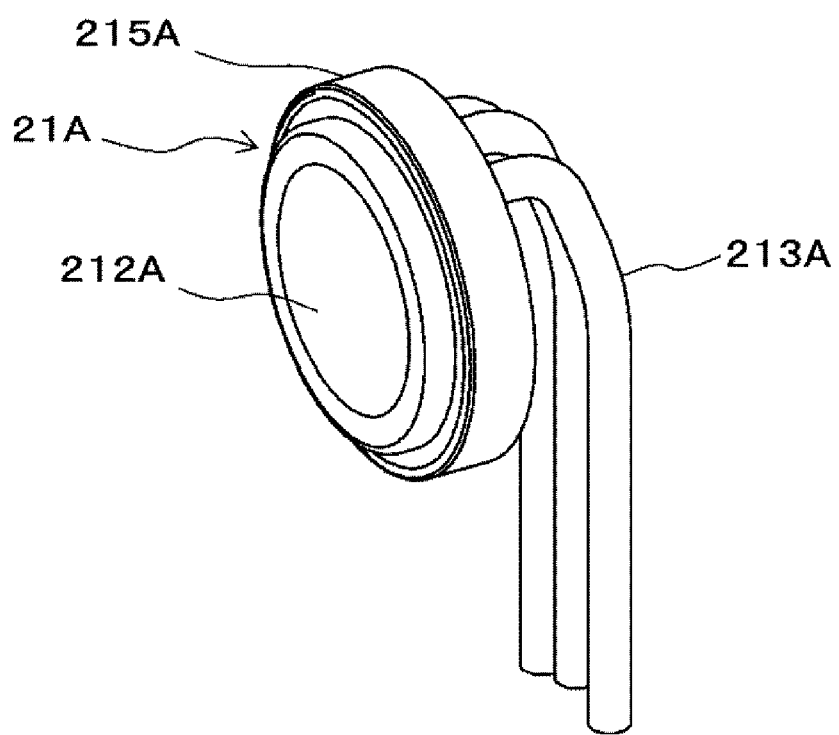
FIG. 6 is a view illustrating a configuration of an example of the load sensor according to the first embodiment.

FIGS. 3 and 4 are views illustrating the configuration of an example of a switch according to the first embodiment, and FIGS. 5 and 6 are views illustrating the configuration of an example of a sensor unit according to the first embodiment. Next, the switch 2A of the first embodiment will be described in detail with reference to the respective drawings.

In the impact driver 10A, the switch 2A is formed on the grip 12 in the vicinity of the electric-tool body 11. The switch 2A includes a trigger 20A that is manipulated by a worker, and a sensor unit 24A having a load sensor 21A that receives a pressing force through the trigger 20A.

The trigger 20A is an example of the switch manipulation part, and is attached to a support part 22A attached to the grip 12 illustrated in FIG. 1 to be movable in directions indicated by arrows F and R. In the present example, a pin 200A formed on the trigger 20A is fitted into an elongated hole 220A formed in a support part 22A, so that the trigger 20A is movably attached to the support part 22A while regulating a moving amount and a moving direction.

The trigger 20A has a manipulation receiving part 201A formed on an outer surface that is one side thereof to be curved in a concave shape, for example, thus making it easy to exert a force in a direction pulling the trigger by a finger. The trigger 20A has a pressing convex part 202A formed on an inner surface that is the other side thereof to protrude in a direction of the load sensor 21A.

The switch 2A includes a coil spring 23A between the trigger 20A and the sensor unit 24A. The trigger 20A is biased in a direction where it moves away from the load sensor 21A, that is, a direction of arrow F, by the coil spring 23A.

The switch 2A is operates as follows: when a forefinger that is a certain finger of a hand holding the grip 12 illustrated in FIG. 1 applies a force in a direction pulling the trigger 20A, the coil spring 23A is compressed and the trigger 20A is moved in the direction indicated by the arrow R. Further, when a force pulling the trigger 20A becomes weak, the trigger 20A is moved in the direction indicated by the arrow F by the restoring force of the coil spring 23A.

FIGS. 5 and 6 are views illustrating the configuration of an example of a load sensor according to the first embodiment. The load sensor 21A includes a pressure-sensitive conductive elastic member 210A that is changed in electric conductivity depending on a load, and a substrate 211A that forms variable resistance having a resistance value that varies depending on a change in electric conductivity of the pressure-sensitive conductive elastic member 210A. A sealing cover 212A covering the pressure-sensitive conductive elastic member 210A and the substrate 211A is attached to the load sensor 21A.

The pressure-sensitive conductive elastic member 210A is made by dispersing conductive particles such as carbon in a non-conductive elastic material such as rubber. The pressure-sensitive conductive elastic member 210A has a plate shape, is elastically deformable in a direction in which it receives a load and then is bent, and in addition, is elastically deformable in a direction in which it is compressed.

The substrate 211A has a pair of conductive patterns that are formed on an outer surface that is one surface facing the pressure-sensitive conductive elastic member 210A to be insulated from each other. Wiring 213A is connected to each conductive pattern.

The sealing cover 212A includes a pressing part 214A that presses the pressure-sensitive conductive elastic member 210A, a seal part (a sealing part) 215A that seals a periphery of the substrate 211A, and a support part 216A that supports the pressure-sensitive conductive elastic member 210A against the substrate 211A. In the sealing cover 212A, the pressing part 214A, the seal part 215A and the support part 216A are integrally formed of the elastic material such as rubber.

In the sealing cover 212A, an internal space 218A is formed to face the pressure-sensitive conductive elastic member 210A. A portion of the pressing part 214A facing the pressure-sensitive conductive elastic member 210A in the internal space 218A is composed of a convex portion that protrudes in a direction of the pressure-sensitive conductive elastic member 210A. The sealing cover 212A is formed integrally with the seal part 215A, with a flexible part 217A being provided around the pressing part 214A. The flexible part 217A is formed to be thinner than the pressing part 214A and the seal part 215A, and does not inhibit the pressing part 214A from being elastically deformed in a direction in which it is separated from the pressure-sensitive conductive elastic member 210A.

The seal part 215A is shaped to seal a side that is the periphery of the substrate 211A and a surface in the vicinity of the side. The support part 216A protrudes from an inner peripheral portion of the seal part 215A to a portion between the pressure-sensitive conductive elastic member 210A and the substrate 211A, and supports a peripheral portion of the pressure-sensitive conductive elastic member 210A against the substrate 211A.

The sensor unit 24A is equipped with the load sensor 21A, and includes a preventing member 240A to prevent foreign matter from entering from surroundings. The preventing member 240A includes a load-sensor cover member 241A that exposes the sealing cover 212A and covers one side of the load sensor 21A, and a load-sensor support member 242A that seals an opposite surface of the sealing cover 212A, which is another side of the load sensor 21A.

As an example of a first cover member, the load-sensor cover member 241A includes an opening 243A that is formed in a portion facing the pressing part 214A of the sealing cover 212A to pass through inner and outer surfaces of the load-sensor cover member 241A. The load-sensor cover member 241A forms, on a side facing the load-sensor support member 242A, a recess having a shape that matches that of the seal part 215A of the sealing cover 212A, thus including a holding portion 244A. The load-sensor cover member 241A has a sealing surface 245A at a portion facing the load-sensor support member 242A on an outside of the holding portion 244A, and has a screw-hole portion 246A that passes through the sealing surface 245A.

As an example of a second cover member, the load-sensor support member 242A includes a sealing surface 248A on a portion facing the load-sensor cover member 241A, and includes a hole portion 249A passing through the sealing surface 248A, in addition to the placement of the screw-hole portion 246A.

The sensor unit 24A comes into contact with the sealing surface 245A of the load-sensor cover member 241A and the sealing surface 248A of the load-sensor support member 242A, in the state where a portion of an inner surface of the substrate 211A of the load sensor 21A comes into contact with a portion of the sealing surface 248A of the load-sensor support member 242A and the sealing cover 212A of the load sensor 21A is put into the holding portion 244A of the load-sensor cover member 241A. By fastening the screw 25A through the hole portion 249A into the screw-hole portion 246A, the load sensor 21A is held between the load-sensor cover member 241A and the load-sensor support member 242A.

When the load sensor 21A is held between the load-sensor cover member 241A and the load-sensor support member 242A, the sealing cover 212A assumes the following state: an outer surface that is one surface of the seal part 215A is in pressure contact with the load-sensor cover member 241A, the inner surface that is another surface of the seal part 215A is in pressure contact with the load-sensor support member 242A, and the seal part 215A is crushed by a predetermined amount. The load sensor 21A is provided inside the seal part 215A such that the substrate 211A is held between the load-sensor cover member 241A and the load-sensor support member 242A. Therefore, the sealing cover 212A functions as a sealer between the sealing surface 245A of the load-sensor cover member 241A and the sealing surface 248A of the load-sensor support member 242A.

Thus, the internal space 218A of the load sensor 21A is sealed. A portion of the sensor unit 24A through which the wiring 213A of the load sensor 21A is taken out from the load-sensor support member 242A is sealed by the sealer 27a.

In the sensor unit 24A, the sealing cover 212A is attached to the support part 22A in a direction facing the trigger 20A. The sensor unit 24A is attached to the support part 22A, for example, through an attaching member (not illustrated) that is formed as an integral or independent component. Alternatively, the sensor unit 24A may be attached to the support part 22A by an adhesive.

In the switch 2A, the pressing convex part 202A of the trigger 20A enters the opening 243A of the load-sensor cover member 241A constituting the sensor unit 24A, and faces the sealing cover 212A of the load sensor 21A.

In the switch 2A, a first malfunction suppressing space L1 is formed between the pressing convex part 202A of the trigger 20A and the sealing cover 212A of the load sensor 21A. In the switch 2A, a second malfunction suppressing space L2 is formed between the pressing part 214A of the sealing cover 212A and the pressure-sensitive conductive elastic member 210A. In the load sensor 21A, an insulating space L3 is formed between the pressure-sensitive conductive elastic member 210A and the substrate 211A.

Operation Example of Switch According to First Embodiment

Next, an operation of the switch 2A of the first embodiment will be described with reference to the respective drawings. In the switch 2A, in the state where the trigger 20A is not pulled, the insulating space L3 is formed between the pressure-sensitive conductive elastic member 210A and the substrate 211A. In the switch 2A, in the state where the insulating space L3 is formed between the pressure-sensitive conductive elastic member 210A and the substrate 211A, a resistance value of the load sensor 21A is infinite, and the load sensor 21A is in a non-conduction state.

In the switch 2A, when the trigger 20A is pulled, the trigger 20A is moved in the direction of arrow R, so that the first malfunction suppressing space L1 is reduced and the pressing convex part 202A comes into contact with the sealing cover 212A. When the trigger 20A is further pulled, the pressing convex part 202A of the trigger 20A presses the sealing cover 212A, so that the second malfunction suppressing space L2 is reduced and the pressing part 214A of the sealing cover 212A comes into contact with the pressure-sensitive conductive elastic member 210A.

When the trigger 20A is further pulled, the pressure-sensitive conductive elastic member 210A is pressed through the trigger 20A and the sealing cover 212A, so that the pressure-sensitive conductive elastic member 210A is elastically deformed in a direction where it is bent, the insulating space L3 is reduced, and the pressure-sensitive conductive elastic member 210A comes into contact with the substrate 211A.

When the trigger 20A is further pulled, the pressure-sensitive conductive elastic member 210A is pressed through the trigger 20A and the sealing cover 212A, so that the pressure-sensitive conductive elastic member 210A is elastically deformed in a direction where it is compressed, in the state where the pressure-sensitive conductive elastic member 210A is in contact with the substrate 211A.

The load sensor 21A has characteristics in which the resistance value varies according to a deformation amount, when the pressure-sensitive conductive elastic member 210A is pressed and deformed. When the deformation amount of the pressure-sensitive conductive elastic member 210A is increased by an increase in load and the resistance value is reduced to a predetermined value, the load sensor 21A assumes a conduction state. When the load is further increased when the load sensor 21A is in the conduction state, the deformation amount of the pressure-sensitive conductive elastic member 210A is increased and the resistance value is further reduced.

As described above, since the pressure-sensitive conductive elastic member 210A is pressed through the trigger 20A, the sum of the first malfunction suppressing space L1, the second malfunction suppressing space L2 and the insulating space L3 is less than the moving amount L4 of the trigger 20A.

When it is possible to secure the insulating space L3 in an initial state where the trigger 20A is not pressed, the first malfunction suppressing space L1 and the second malfunction suppressing space L2 may not be formed. However, in consideration of a possibility that a load is applied to the pressure-sensitive conductive elastic member 210A by the dimensional tolerance of each component and the accumulation of tolerance when respective components are assembled with each other, in the initial state where the trigger 20A is not pressed, the first malfunction suppressing space L1 and the second malfunction suppressing space L2 are formed.

The insulating space L3 may be sensuously considered to be "0", in the manipulation of pulling the trigger 20A with a person's finger. Thus, the moving amount L4 of the trigger 20A is set to be 0 mm or more and 3 mm or less.

In the switch 2A using the load sensor 21A having the pressure-sensitive conductive elastic member 210A, it is unnecessary to have a mechanical variable resistor, such as a sliding resistor or a rotary resistor. Conventionally, the stroke of the trigger is determined by a movable range of the variable resistor. In contrast, in the switch 2A, a degree of freedom upon determining the stroke of the trigger 20A is improved.

The switch 2A is configured such that the trigger 20A is movable. However, this employs the load sensor 21A having the pressure-sensitive conductive elastic member 210A. Thus, when comparing this configuration with the configuration having the mechanical variable resistor, the former may reduce the number of moving components as well as a movable amount of each component, and may achieve a reduction in size of the switch. The reduction in size of the switch 2A may improve a degree of freedom upon placing the trigger 20A. For example, in addition to a normal position where the switch may be manipulated by the forefinger of the hand holding the grip 12, the switch 2A may be additionally provided on a lower portion of the grip 12, thus allowing another trigger 20A to be manipulated even on the lower portion of the grip 12. Alternatively, the switch 2A may be additionally provided on the electric-tool body 11, thus allowing another trigger 20A to be manipulated even on the electric-tool body 11. Therefore, it is possible to change a method of holding the tool according to the kind of work and to lessen a workload.

In the switch 2A, when the load sensor 21A is held between the load-sensor cover member 241A and the load-sensor support member 242A, the sealing cover 212A is pressed on the load-sensor support member 242A by the holding portion 244A of the load-sensor cover member 241A, and the seal part 215A is crushed in a thickness direction.

Thus, the outer surface that is one surface of the seal part 215A is in pressure contact with the holding portion 244A of the load-sensor cover member 241A, while the inner surface that is another surface of the seal part 215A is in pressure contact with the sealing surface 248A of the load-sensor support member 242A. Therefore, the sealing cover 212A functions as a sealer between the sealing surface 245A of the load-sensor cover member 241A and the sealing surface 248A of the load-sensor support member 242A.

Therefore, in the sensor unit 24A, the sealing surface 245A of the load-sensor cover member 241A is in pressure contact with the sealing surface 248A of the load-sensor support member 242A, and the seal part 215A of the sealing cover 212A is crushed, so that the internal space 218A of the load sensor 21A is sealed. A portion of the sensor unit 24A through which the wiring 213A of the load sensor 21A is taken out from the load-sensor support member 242A is sealed by the sealer 27a.

Since the sensor unit 24A is configured to prevent moisture or dust from entering into the internal space 218A of the load sensor 21A and to prevent moisture or dust from entering into the inner surface of the substrate 211A, it is possible to realize the waterproof and dustproof structure for the pressure-sensitive conductive elastic member 210A and the substrate 211A of the load sensor 21A. The switch 2A is configured such that the trigger 20A is movable, but the sensor unit 24A independent of the trigger 20A has the waterproof and dustproof structure. Thus, it is unnecessary to provide water-proofness and dust-proofness to a sliding portion, so that it is possible to realize the waterproof and dustproof structure with a simple configuration.

Configuration Example of Switch According to Second Embodiment

Figure 7:
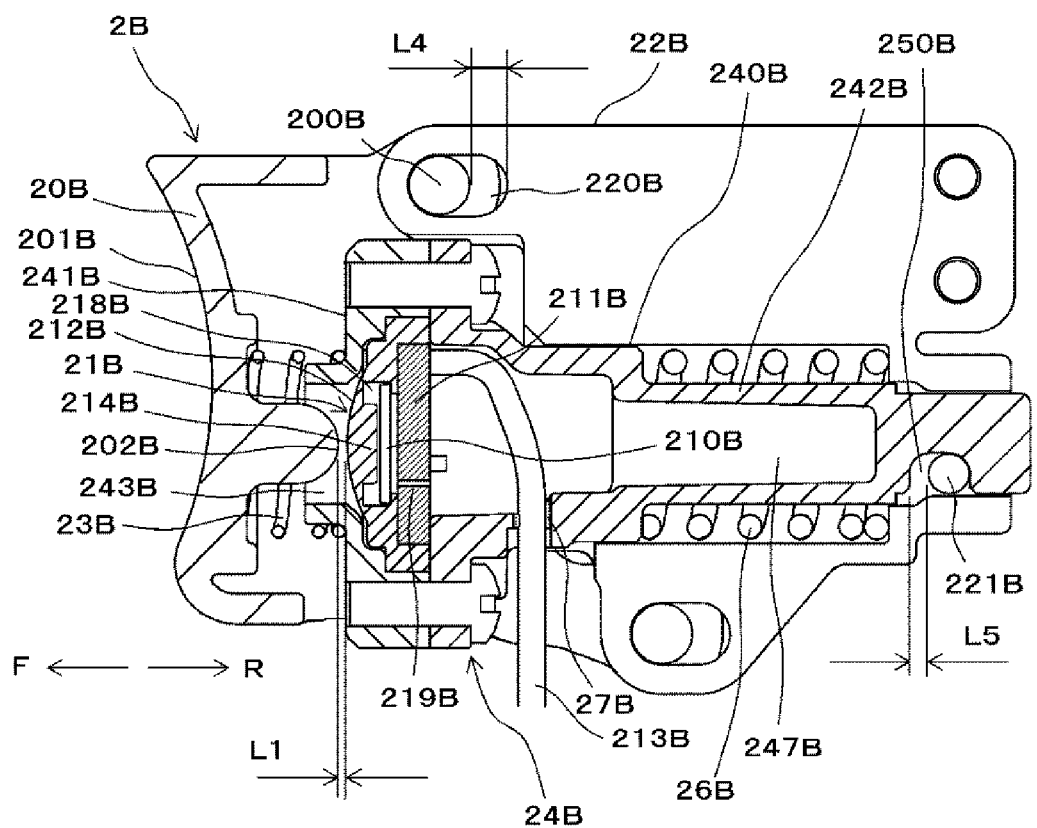
FIG. 7 is a view illustrating a configuration of an example of a switch according to a second embodiment.
Figure 8:
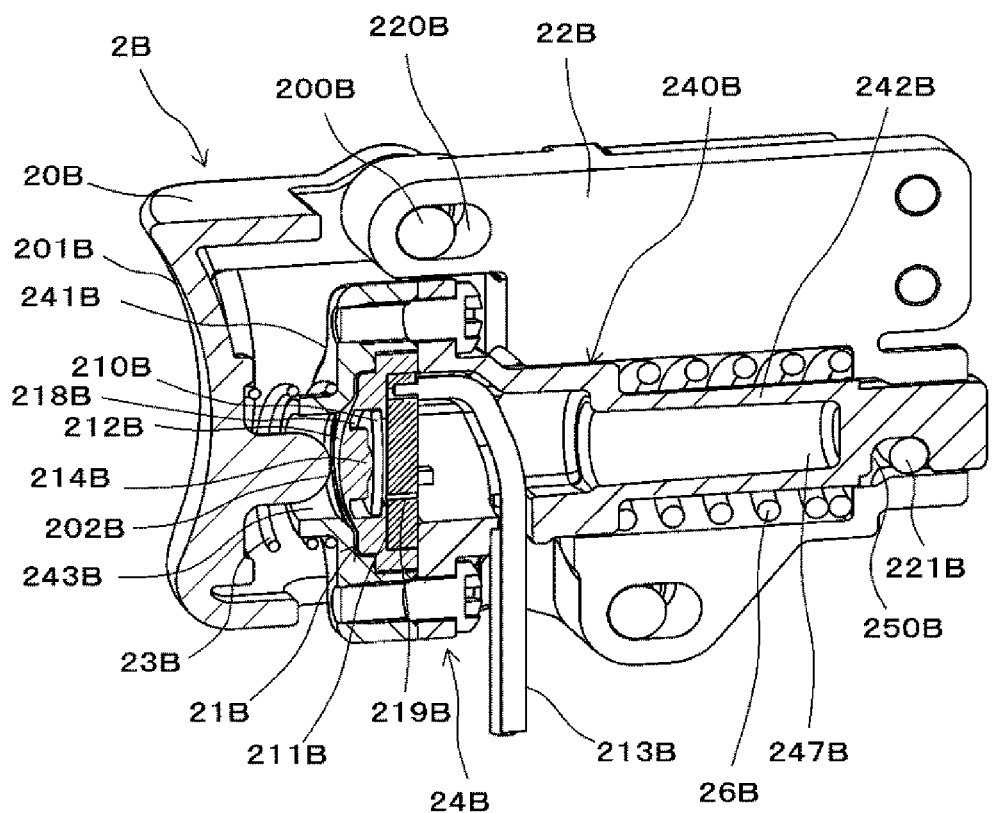
FIG. 8 is a view illustrating a configuration of an example of the switch according to the second embodiment.
Figure 9:
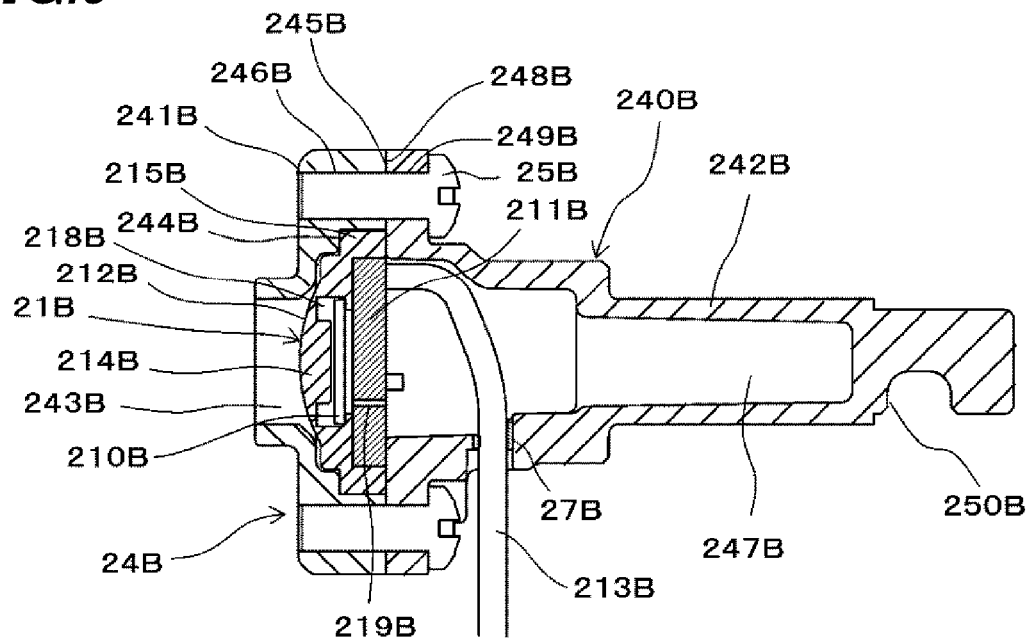
FIG. 9 is a view illustrating a configuration of an example of a sensor unit according to the second embodiment.
Figure 10:
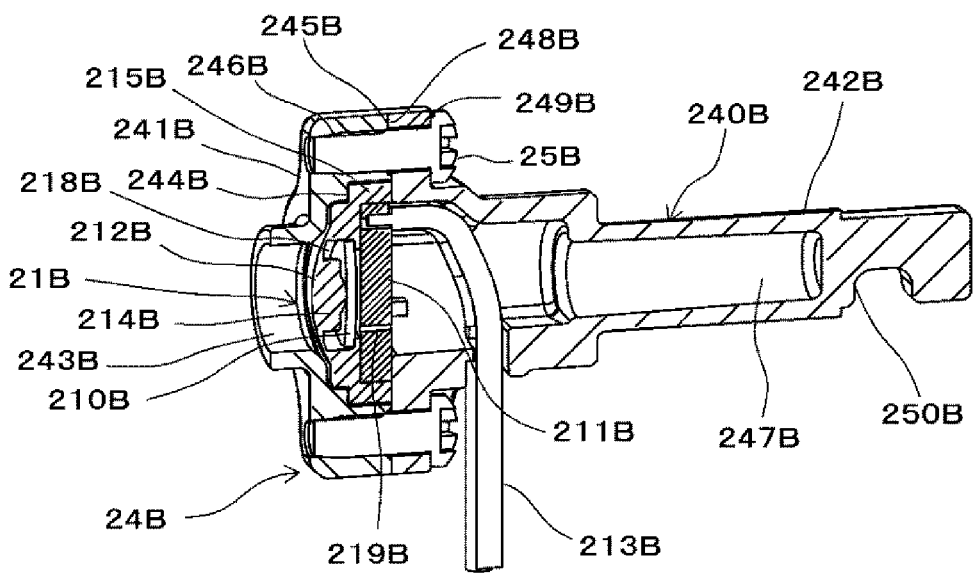
FIG. 10 is a view illustrating a configuration of an example of the sensor unit according to the second embodiment.

FIGS. 7 and 8 are views illustrating the configuration of an example of a switch according to the second embodiment, and FIGS. 9 and 10 are views illustrating the configuration of an example of a sensor unit according to the second embodiment. Next, the switch 2B of the second embodiment will be described in detail with reference to the respective drawings.

In the impact driver 10A, the switch 2B is formed on the grip 12 in the vicinity of the electric-tool body 11. The switch 2B includes a trigger 20B that is manipulated by a worker, and a sensor unit 24B having a load sensor 21B that receives a pressing force through the trigger 20B.

The trigger 20B is an example of the switch manipulation part, and is attached to a support part 22B attached to the grip 12 illustrated in FIG. 1 to be movable in directions indicated by arrows F and R. In the present example, a pin 200B formed on the trigger 20B is fitted into an elongated hole 220b formed in a support part 22B, so that the trigger 20B is movably attached to the support part 22B while regulating a moving amount and a moving direction.

The trigger 20B has a manipulation receiving part 201B formed on an outer surface that is one side thereof to be curved in a concave shape, for example, thus making it easy to exert a force in a direction pulling the trigger by a finger. The trigger 20B has a pressing convex part 202B formed on an inner surface that is the other side thereof to protrude in a direction of the load sensor 21B.

The switch 2B includes a coil spring 23B between the trigger 20B and the sensor unit 24B. The trigger 20B is biased in a direction where it moves away from the load sensor 21B, that is, a direction of arrow F, by the coil spring 23B.

The switch 2B is operates as follows: when a forefinger that is a certain finger of a hand holding the grip 12 illustrated in FIG. 1 applies a force in a direction pulling the trigger 20B, the coil spring 23B is compressed and the trigger 20B is moved in the direction indicated by the arrow R. Further, when a force pulling the trigger 20B becomes weak, the trigger 20B is moved in the direction indicated by the arrow F by the restoring force of the coil spring 23B.

Figure 11:
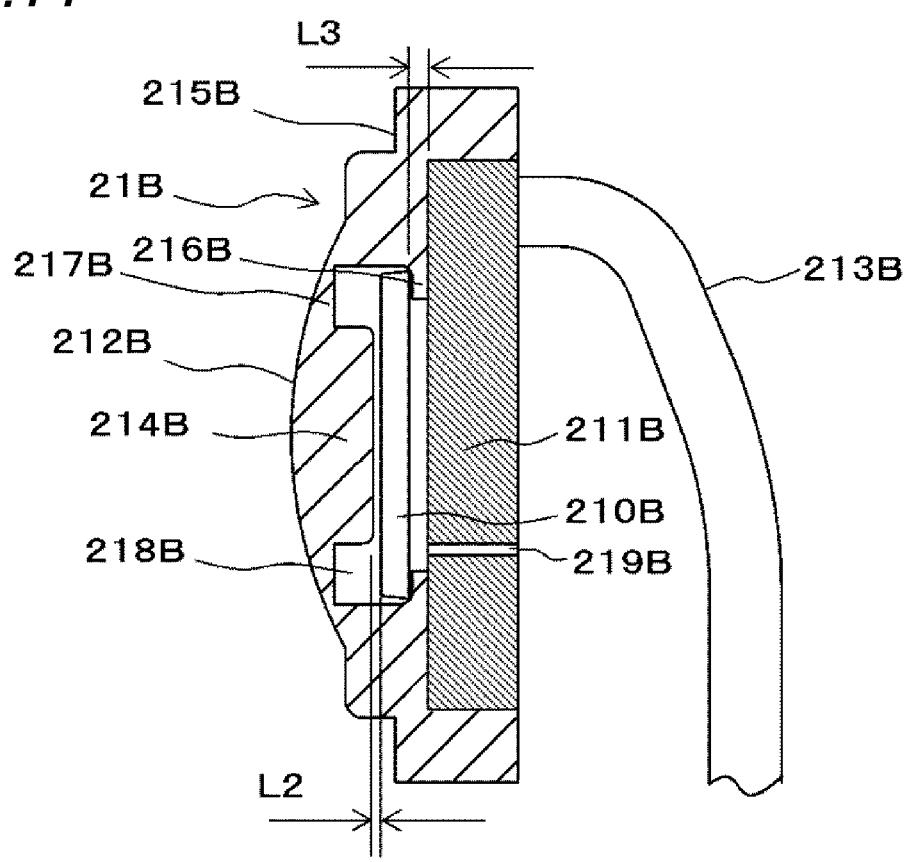
FIG. 11 is a view illustrating a configuration of an example of a load sensor according to the second embodiment.
Figure 12:
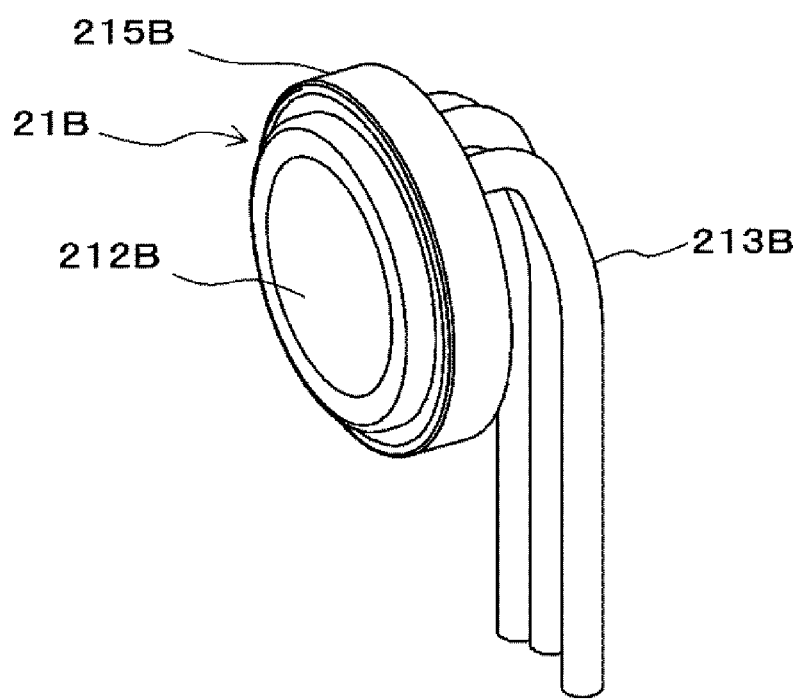
FIG. 12 is a view illustrating a configuration of an example of the load sensor according to the second embodiment.

FIGS. 11 and 12 are views illustrating the configuration of an example of a load sensor according to the second embodiment. The load sensor 21B includes a pressure-sensitive conductive elastic member 210B that is changed in electric conductivity depending on a load, and a substrate 211B that forms variable resistance having a resistance value that varies depending on a change in electric conductivity of the pressure-sensitive conductive elastic member 210B. A sealing cover 212B covering the pressure-sensitive conductive elastic member 210B and the substrate 211B is attached to the load sensor 21B.

The pressure-sensitive conductive elastic member 210B is made by dispersing conductive particles such as carbon in a non-conductive elastic material such as rubber. The pressure-sensitive conductive elastic member 210B has a plate shape, is elastically deformable in a direction in which it receives a load and then is bent, and in addition, is elastically deformable in a direction in which it is compressed.

The substrate 211B has a pair of conductive patterns that are formed on an outer surface that is one surface facing the pressure-sensitive conductive elastic member 210B to be insulated from each other. Wiring 213B is connected to each conductive pattern. The substrate 211B includes a connecting portion 219B as an example of a relieving part that has a diameter allowing air to pass therethrough and penetrates inner and outer surfaces.

The sealing cover 212B includes a pressing part 214B that presses the pressure-sensitive conductive elastic member 210B, a seal part 215B that seals a periphery of the substrate 211B, and a support part 216B that supports the pressure-sensitive conductive elastic member 210B against the substrate 211B. In the sealing cover 212B, the pressing part 214B, the seal part 215B and the support part 216B are integrally formed of the elastic material such as rubber.

In the sealing cover 212B, an internal space 218B is formed to face the pressure-sensitive conductive elastic member 210B. A portion of the pressing part 214B facing the pressure-sensitive conductive elastic member 210B in the internal space 218B is composed of a convex portion that protrudes in a direction of the pressure-sensitive conductive elastic member 210B. The sealing cover 212B is formed integrally with the seal part 215B, with a flexible part 217B being provided around the pressing part 214B. The flexible part 217B is formed to be thinner than the pressing part 214B and the seal part 215B, and does not inhibit the pressing part 214B from being elastically deformed in a direction in which it is separated from the pressure-sensitive conductive elastic member 210B.

The seal part 215B is shaped to seal a side of the substrate 211B and a surface in the vicinity of the side. The support part 216B protrudes from an inner peripheral portion of the seal part 215B to a portion between the pressure-sensitive conductive elastic member 210B and the substrate 211B, and supports a peripheral portion of the pressure-sensitive conductive elastic member 210B against the substrate 211B.

The sensor unit 24B is equipped with the load sensor 21B, and includes an preventing member 240B to prevent foreign matter from entering from surroundings. The preventing member 240B includes a load-sensor cover member 241B that exposes the sealing cover 212B and covers one side of the load sensor 21B, and a load-sensor support member 242B that seals an opposite surface of the sealing cover 212B, which is another side of the load sensor 21B.

As an example of a first cover member, the load-sensor cover member 241B includes an opening 243B that is formed in a portion facing the pressing part 214B of the sealing cover 212B to pass through inner and outer surfaces of the load-sensor cover member 241B. The load-sensor cover member 241B forms, on a side facing the load-sensor support member 242B, a recess having a shape that matches that of the seal part 215B of the sealing cover 212B, thus including a holding portion 244B. The load-sensor cover member 241B has a sealing surface 245B at a portion facing the load-sensor support member 242B on an outside of the holding portion 244B, and has a screw-hole portion 246B that passes through the sealing surface 245B.

As an example of a second cover member, the load-sensor support member 242B forms, on the inner surface of the load sensor 21B, a closed space 247B that has a predetermined volume for the internal space 218B and allows air to flow between the closed space and the internal space 218A, as an example of a relieving part. The load-sensor support member 242B includes a sealing surface 248B on a portion facing the load-sensor cover member 241B outside of the closed space 247B, and includes a hole portion 249B passing through the sealing surface 248B, in addition to the placement of the screw-hole portion 246B.

The sensor unit 24B comes into contact with the sealing surface 245B of the load-sensor cover member 241B and the sealing surface 248B of the load-sensor support member 242B, in the state where a portion of an inner surface of the substrate 211B of the load sensor 21B comes into contact with a portion of the sealing surface 248B of the load-sensor support member 242B and the sealing cover 212B of the load sensor 21B is put into the holding portion 244B of the load-sensor cover member 241B. By fastening the screw 25B through the hole portion 249B into the screw-hole portion 246B, the load sensor 21B is held between the load-sensor cover member 241B and the load-sensor support member 242B.

When the load sensor 21B is held between the load-sensor cover member 241B and the load-sensor support member 242B, the sealing cover 212B assumes the following state: an outer surface that is one surface of the seal part 215B is in pressure contact with the load-sensor cover member 241B, the inner surface that is another surface of the seal part 215B is in pressure contact with the load-sensor support member 242B, and the seal part 215B is crushed by a predetermined amount. The load sensor 21B is provided inside the seal part 215B such that the substrate 211B is held between the load-sensor cover member 241B and the load-sensor support member 242B. Therefore, the sealing cover 212B functions as a sealer between the sealing surface 245B of the load-sensor cover member 241B and the sealing surface 248B of the load-sensor support member 242B.

Thus, the internal space 218B of the load sensor 21B is sealed, and in addition, the closed space 247B is sealed. A portion of the sensor unit 24B through which the wiring 213B of the load sensor 21B is taken out from the load-sensor support member 242B is sealed by the sealer 27B.

The sensor unit 24B is configured such that the internal space 218B and the closed space 247B between which the substrate 211B of the load sensor 21B is connected with each other via the connecting portion 219B, and air flows between the internal space 218B and the closed space 247B.

The sensor unit 24B is attached to the support part 22B to be movable in the moving direction of the trigger 20B as well as in the directions indicated by arrows F and R. The coil spring 26B is fitted between the sensor unit 24B and the support part 22B, so that the sensor unit is biased in the direction of arrow F, namely, a direction in which it approaches the trigger 20B. A regulation part 250B enters a pin 221B formed on the support part 22B, thus regulating the moving amount of the sensor unit 24B in the direction of arrow F when it is biased by the coil spring 26B, and the moving amount of the sensor unit in the direction of arrow R when it is pressed through the trigger 20B.

In the switch 2B, the pressing convex part 202B of the trigger 20B enters the opening 243B of the load-sensor cover member 241B constituting the sensor unit 24B, and faces the sealing cover 212B of the load sensor 21B.

In the switch 2B, a first malfunction suppressing space L1 is formed between the pressing convex part 202B of the trigger 20B and the sealing cover 212B of the load sensor 21B. In the switch 2B, a second malfunction suppressing space L2 is formed between the pressing part 214B of the sealing cover 212B and the pressure-sensitive conductive elastic member 210B. In the load sensor 21B, an insulating space L3 is formed between the pressure-sensitive conductive elastic member 210B and the substrate 211B.

Operation Example of Switch According to Second Embodiment

Figure 13:
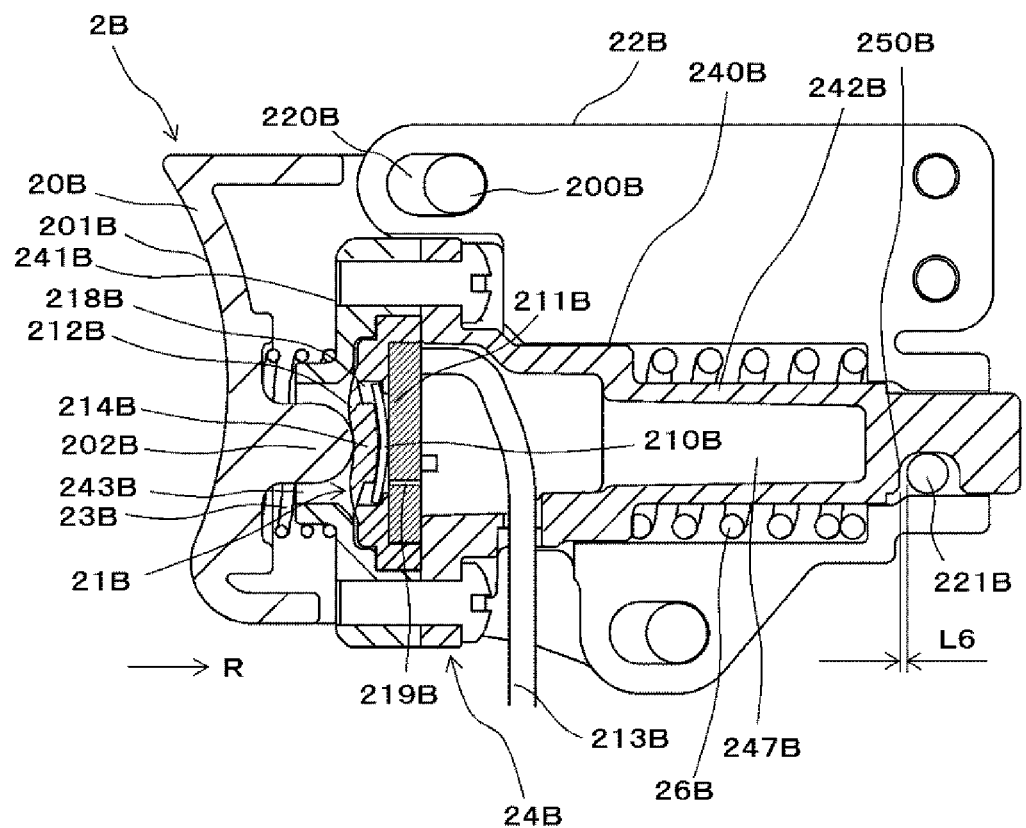
FIG. 13 is a view illustrating an example of an operation of the switch according to the second embodiment.
Figure 14:
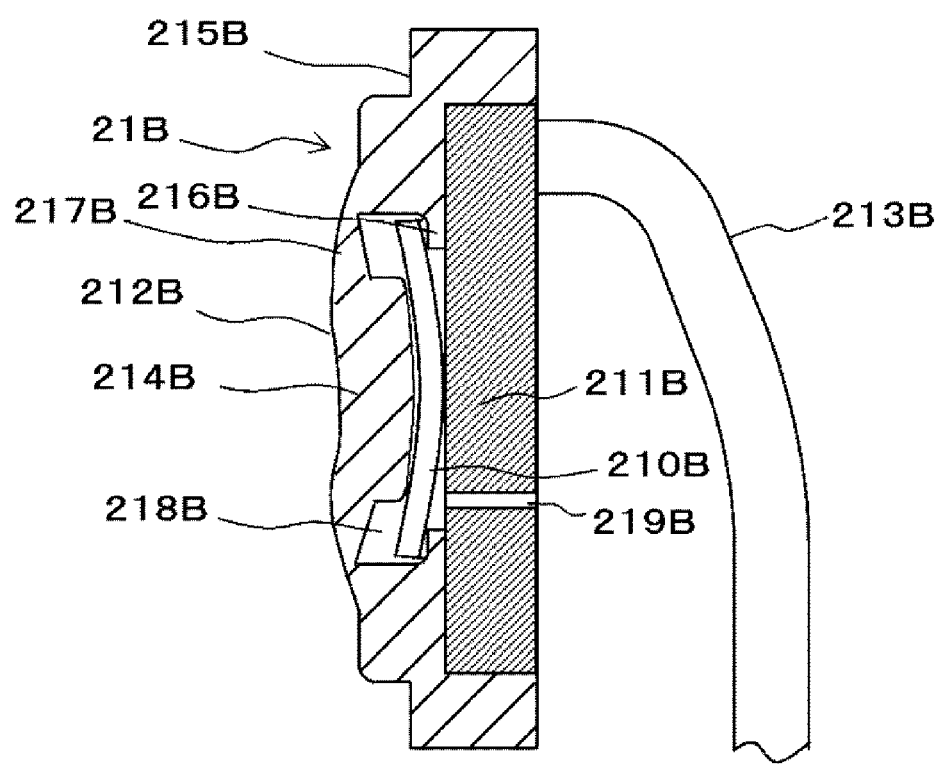
FIG. 14 is a view illustrating an example of an operation of the load sensor according to the second embodiment.

FIG. 13 is a view illustrating an example of an operation of the switch according to the second embodiment, and FIG. 14 is a view illustrating an example of an operation of the load sensor according to the second embodiment. Next, an operation of the switch 2B of the second embodiment will be described with reference to the respective drawings.

In the switch 2B, in the state where the trigger 20B is not pulled, the insulating space L3 is formed between the pressure-sensitive conductive elastic member 210B and the substrate 211B. In the switch 2B, in the state where the insulating space L3 is formed between the pressure-sensitive conductive elastic member 210B and the substrate 211B, a resistance value of the load sensor 21B is infinite, and the load sensor 21B is in a non-conduction state.

In the switch 2B, when the trigger 20B is pulled, the trigger 20B is moved in the direction of arrow R, so that the first malfunction suppressing space L1 is reduced and the pressing convex part 202B comes into contact with the sealing cover 212B. When the trigger 20B is further pulled, the pressing convex part 202B of the trigger 20B presses the sealing cover 212B, so that the second malfunction suppressing space L2 is reduced and the pressing part 214B of the sealing cover 212B comes into contact with the pressure-sensitive conductive elastic member 210B.

When the trigger 20B is further pulled, the pressure-sensitive conductive elastic member 210B is pressed through the trigger 20B and the sealing cover 212B, so that the pressure-sensitive conductive elastic member 210B is elastically deformed in a direction where it is bent, the insulating space L3 is reduced, and the pressure-sensitive conductive elastic member 210B comes into contact with the substrate 211B.

When the trigger 20B is further pulled, the pressure-sensitive conductive elastic member 210B is pressed through the trigger 20B and the sealing cover 212B, so that the pressure-sensitive conductive elastic member 210B is elastically deformed in a direction where it is compressed, in the state where the pressure-sensitive conductive elastic member 210B is in contact with the substrate 211B.

The load sensor 21B has characteristics in which the resistance value varies depending on a deformation amount, when the pressure-sensitive conductive elastic member 210B is pressed and deformed. When the deformation amount of the pressure-sensitive conductive elastic member 210B is increased by an increase in load and the resistance value is reduced to a predetermined value, the load sensor 21B assumes a conduction state. Further, if the load is further increased when the load sensor 21B is in the conduction state, the deformation amount of the pressure-sensitive conductive elastic member 210B is increased and the resistance value is further reduced.

As described above, since the pressure-sensitive conductive elastic member 210B is pressed through the trigger 20B, the sum of the first malfunction suppressing space L1, the second malfunction suppressing space L2 and the insulating space L3 is less than the moving amount L4 of the trigger 20B.

Further, when it is possible to secure the insulating space L3 in an initial state where the trigger 20B is not pressed, the first malfunction suppressing space L1 and the second malfunction suppressing space L2 may not be formed. However, in consideration of a possibility that a load is applied to the pressure-sensitive conductive elastic member 210B by the dimensional tolerance of each component and the accumulation of tolerance when respective components are assembled with each other, in the initial state where the trigger 20B is not pressed, the first malfunction suppressing space L1 and the second malfunction suppressing space L2 are formed.

The insulating space L3 may be sensuously considered to be "0", in the manipulation of pulling the trigger 20B with a person's finger. Thus, the moving amount L4 of the trigger 20B is set to be 0 mm or more and 3 mm or less.

In the switch 2B using the load sensor 21B having the pressure-sensitive conductive elastic member 210B, it is unnecessary to have a mechanical variable resistor, such as a sliding resistor or a rotary resistor. Conventionally, the stroke of the trigger is determined by a movable range of the variable resistor. In contrast, in the switch 2B, a degree of freedom upon determining the stroke of the trigger 20B is improved.

The switch 2B is configured such that the trigger 20B and the sensor unit 24B are movable. However, this employs the load sensor 21B having the pressure-sensitive conductive elastic member 210B. Thus, when comparing this configuration with the configuration having the mechanical variable resistor, the former may reduce a movable amount of a component and achieve a reduction in size of the switch.

In the switch 2B, when the load sensor 21B is held between the load-sensor cover member 241B and the load-sensor support member 242B, the sealing cover 212B is pressed on the load-sensor support member 242B by the holding portion 244B of the load-sensor cover member 241B, and the seal part 215B is crushed in a thickness direction.

Thus, the outer surface that is one surface of the seal part 215B is in pressure contact with the holding portion 244B of the load-sensor cover member 241B, while the inner surface that is another surface of the seal part 215B is in pressure contact with the sealing surface 248B of the load-sensor support member 242B. Therefore, the sealing cover 212B functions as a sealer between the sealing surface 245B of the load-sensor cover member 241B and the sealing surface 248B of the load-sensor support member 242B.

Therefore, in the sensor unit 24B, the sealing surface 245B of the load-sensor cover member 241B is in pressure contact with the sealing surface 248B of the load-sensor support member 242B, and the seal part 215B of the sealing cover 212B is crushed, so that the internal space 218B of the load sensor 21B as well as the closed space 247B is sealed. A portion of the sensor unit 24B through which the wiring 213B of the load sensor 21B is taken out from the closed space 247B of the load-sensor support member 242B is sealed by the sealer 27B.

Since the sensor unit 24B is configured to prevent moisture or dust from entering into the internal space 218B of the load sensor 21B and to prevent moisture or dust from entering into the closed space 247B on the inner surface of the substrate 211B, it is possible to realize the waterproof and dustproof structure for the pressure-sensitive conductive elastic member 210B and the substrate 211B of the load sensor 21B. The switch 2B is configured such that the trigger 20B and the sensor unit 24B are movable, but the trigger 20B and the sensor unit 24B, as independent members, have the waterproof and dustproof structure in the sensor unit 24B. Thus, it is unnecessary to provide water-proofness and dust-proofness to a sliding portion, so that it is possible to realize the waterproof and dustproof structure with a simple configuration.

The switch 2B is configured such that a reaction force of the coil spring 26B biasing the sensor unit 24B is stronger than that of the coil spring 23B biasing the trigger 20B. Thus, in the manipulation where the trigger 20B is pulled by a normal force, the trigger 20B is moved in the direction of arrow R, so that the pressure-sensitive conductive elastic member 210B is pressed through the trigger 20B and the sealing cover 212B.

However, when the deformation amount permitted by the sealing cover 212B and the pressure-sensitive conductive elastic member 210B is exceeded and in addition, a force exceeding a predetermined level acts on the trigger 20B, the coil spring 26B is compressed, so that the sensor unit 24B is moved in the direction of arrow R and the load sensor 21B is retracted.

A moving amount L5 of the sensor unit 24B is set to allow the sensor unit 24B to move in the direction of arrow R even when the moving amount of the trigger 20B reaches a maximum (=L4). Thus, even when the trigger 20B is completely pulled as well as when the trigger 20B is being pulled, as illustrated in FIG. 13, a retraction permitting space L6 is formed between the regulation part 250B and the pin 221B formed on the support part 22B. Thus, the load sensor 21B may be retracted in the direction of arrow R, and it is possible to suppress a load exceeding a predetermined level from being applied to the load sensor 21B.

In the switch 2B, when the trigger 20B presses the sealing cover 212B, as illustrated in FIG. 14, the volume of the internal space 218B is reduced. In the sensor unit 24B, the sealing surface 245B of the load-sensor cover member 241B is in pressure contact with the sealing surface 248B of the load-sensor support member 242B, so that the closed space 247B is sealed and the entering of moisture or dust is suppressed and prevented.

Therefore, when the trigger 20B presses the sealing cover 212B, so that the volume of the internal space 218B is reduced and a pressure in the internal space 218B is increased, air in the internal space 218B may possibly leak from between the sealing surface 245B of the load-sensor cover member 241B and the sealing surface 248B of the load-sensor support member 242B to an outside. When the air leaks from the internal space 218B to the outside, a pressure of the internal space 218B becomes negative when the pressing force by the trigger 20B is released and thus the sealing cover 212B is restored to its original shape using the elasticity, so that it may be difficult to restore the sealing cover 212B to its original shape using the elasticity.

Hence, the internal space 218B and the closed space 247B are configured to be connected with each other via the connecting portion 219B, in the state where the substrate 211B of the load sensor 21B is interposed between the internal space and the closed space. Such a configuration allows the air of the internal space 218B to flow into the closed space 247B, when the sealing cover 212B is pressed by the trigger 20B.

Since the closed space 247B has a sufficiently large volume as compared to the internal space 218B, a rise in pressure occurring when air corresponding to a volume reducing proportion of the internal space 218B flows may be ignored, and the leakage of air from between the sealing surface 245B of the load-sensor cover member 241B and the sealing surface 248B of the load-sensor support member 242B is sufficiently suppressed.

Therefore, when the pressing force by the trigger 20B is released and the sealing cover 212B is intended to restore its original shape by the elasticity of the sealing cover 212B, the pressure of the internal space 218B does not become negative, and the sealing cover 212B is reliably restored to its original shape by the elasticity.

Here, the relieving part may have a configuration that allows the air of the internal space 218B to flow, when the sealing cover 212B is pressed by the trigger 20B. The relieving part may be configured to expand the sealing cover 212B and expand the internal space 218B or a space connecting with the internal space 218B with the rise in pressure of the internal space 218B, for example, when the sealing cover 212B is pressed by the trigger 20B.

Starting Operation Example According to Control Unit

Next, the starting operation of the control unit 3 equipped with the above-described switches 2A and 2B will be described with reference to the respective drawings. In the following description, the switches 2A and 2B are simply referred to as the switch 2, and the load sensors 21A and 21B are simply referred to as the load sensor 21. The pressure-sensitive conductive elastic members 210A and 210B are simply referred to as the pressure-sensitive conductive elastic member 210, and the substrates 211A and 211B are simply referred to as the substrate 211.

The control unit 3 detects a resistance value Ra of the load sensor 21 that is changed when the pressure-sensitive conductive elastic member 210 is pressed by the manipulation of the switch 2, and then outputs a control signal Dd depending on the detected resistance value. Since the resistance value Ra of the load sensor 21 is changed by the force pressing the trigger 20, it is possible to control the motor M in response to a control signal Dd due to acceleration/deceleration manipulation of the trigger 20 by a user. Further, an illumination system such as an LED may be prepared as the electric component.

The control circuit 4 is a start circuit of the control unit 3, and forms a circuit that causes an electric current to flow from the power supply unit 5 to the control unit 3 when the resistance value Ra of the load sensor 21 is reduced from an initial value by a predetermined amount, when the pressure-sensitive conductive elastic member 210 is pressed by manipulating the switch 2.

The control circuit 4 includes, for example, a first switch circuit 41 composed of a transistor Tr1 or the like, and a second switch circuit 42 composed of a transistor Tr2 or the like.

As described above, in the state where the trigger 20 is not pressed and the insulating space L3 is formed between the pressure-sensitive conductive elastic member 210 and the substrate 211, the resistance value of the load sensor 21 is infinite and the load sensor 21 is in a non-conduction state. Thus, since the transistor Tr1 of the first switch circuit 41 is in an OFF state and no electric current flows in the transistor Tr1, power is not fed from the power supply unit 5 to a power supply driver 53, and a predetermined voltage is not applied from the power supply driver 53 to the control unit 3. Since the control unit 3 is not started, the transistor Tr2 of the second switch circuit 42 is in an OFF state, and no electric current flows in the transistor Tr2. Therefore, a state where power is interrupted is realized.

In the switch 2, when the trigger 20 is pulled, the insulating space L3 is reduced, and the pressure-sensitive conductive elastic member 210 comes into contact with the substrate 211. When the trigger 20 is further pulled and the pressure-sensitive conductive elastic member 210 coming into contact with the substrate 211 is deformed in a direction where it is compressed by a predetermined amount, the load sensor 21 is in a conduction state.

When the load sensor 21 is in the conduction state, the transistor Tr1 of the first switch circuit 41 is in an ON state, and thus an electric current flows in the transistor Tr1. As the electric current flows in the transistor Tr1, power is fed from the power supply unit 5 to the power supply driver 53, and a predetermined voltage Vcc is applied from the power supply driver 53 to the control unit 3. The control unit 3 is started.

When the control unit 3 is started, a power supply maintenance signal Dk is outputted from the control unit 3, the transistor Tr2 of the second switch circuit 42 is in an ON state, and an electric current flows in the transistor Tr2. Therefore, in the power supply maintenance circuit 43, the transistor Tr1 of the first switch circuit 41 is maintained in the ON state, and the feeding of power from the power supply unit 5 to the power supply driver 53 is possible.

Thus, when a user presses the trigger 20 by his or her finger to operate the electric tool 1A, such as the impact driver 10A, the control unit 3 may be started in the initial state where the load applied to the load sensor 21 through the trigger 20 is low.

In the load sensor 21, the resistance value Ra varies depending on the load applied to the pressure-sensitive conductive elastic member 210 through the trigger 20. The control unit 3 inputs the resistance value Ra of the load sensor 21 from a resistance-value detection circuit 44, outputs a control signal Dd, which depends on the resistance value Ra of the load sensor 21 and controls an output value of pulse width modulation (PWM), for example, to a driving circuit 6, and controls the motor M. Thus, it is possible to control the strength of the force pulling the trigger 20 and the number of rotations of the motor M.

Further, when the force for pulling the trigger 20 is reduced and the load sensor is restored to the state where the insulating space L3 is formed between the pressure-sensitive conductive elastic member 210 and the substrate 211, the load sensor 21 is in the non-conduction state. When it is determined that the resistance value Ra of the load sensor 21 has a predetermined value, in the present example, an infinite value, the control unit 3 outputs the control signal Dd to stop rotating the motor M. Thus, as the force for pulling the trigger 20 is reduced below a predetermined level or the finger is released from the trigger 20, the motor M stops rotating.

For a predetermined time after the resistance value Ra of the load sensor 21 has reached the infinite value, the control unit 3 continues to output the power supply maintenance signal Dk. Thus, even when the load sensor 21 assumes the non-conduction state, the feeding of power from the power supply unit 5 to the power supply driver 53 is continued, and the feeding of voltage Vcc from the power supply driver 53 to the control unit 3 is continued.

At a predetermined time after the resistance value Ra of the load sensor 21 has reached the infinite value, the control unit 3 stops outputting the power supply maintenance signal Dk. Thus, the transistor Tr2 in the second switch circuit 42 is in the OFF state and no electric current flows in the transistor Tr2. Further, the transistor Tr1 in the first switch circuit 41 is in the OFF state. Since both the first switch circuit 41 and the second switch circuit 42 are in the OFF state, power is not fed from the power supply unit 5 to the power supply driver 53, and voltage Vcc is not applied from the power supply driver 53 to the control unit 3. Therefore, a state where power is interrupted is realized.

Therefore, in order to start the control unit 3, it is unnecessary to form a switch different from the load sensor 21, and it is possible to start the control unit 3 and control the motor M by the control unit 3, with one set of switches 2 using the load sensor 21.

Therefore, a reduction in size of the switch 2 is possible. The reduction in size of the switch 2 may decrease an area in the grip 12 occupied by the switch 2, and consequently may achieve a reduction in size of the entire apparatus.

The load sensor may be configured such that conductive patterns are formed on both sides of the pressure-sensitive conductive elastic member, and the pressure-sensitive conductive elastic member is elastically deformed in a direction where it is compressed, thus changing a conduction state on the inner and outer surfaces of the pressure-sensitive conductive elastic member and the resistance value.

In the above description, the impact driver has been exemplified as the electric tool. However, the invention may be applied to an electric driver having no hitting mechanism, an electric saw, an electric file or the like, and the switch 2 (2A and 2B) of each embodiment may be applied to the manipulation part that manipulates the rotation of the motor using the electric tool. The load sensor 21 (21A and 21B) of each embodiment may be provided as a switch other than the manipulation part for manipulating the rotation of the motor. Further, the power supply unit may be a detachable battery as well as a configuration operated by supplying AC power using a power cable.

The tool may have a configuration that is operated by gas pressure such as air or gas or by liquid pressure such as oil, and may control the electric component such as an electronic valve that regulates the opening and closing of the valve and an opening degree thereof, via the switch applying the load sensor 21 (21A and 21B) of each embodiment to manipulate of the electric component.

Although an example of using the pressure-sensitive conductive elastic member as the load sensor has been described, a semiconductor- or strain gauge-type load sensor may be used.

(1) A tool comprising:
a switch that is configured to cause an electric component to operate; and
a handle that is held by a hand to manipulate the switch, wherein the switch includes:
a switch manipulation part to be manipulated;
a load sensor that is configured to receive a pressing force through the switch manipulation part;
a sealing cover that includes an elastic material which is deformable when receiving the pressing force through the switch manipulation part, and that is configured to press the load sensor; and
a preventing member that is configured to seal an internal space between the sealing cover and the load sensor, around the load sensor.

(2) The tool according to (1),
wherein the sealing cover includes a sealing part on a periphery of the load sensor,
wherein the preventing member includes a first cover which has an opening formed on one side of the load sensor to expose the sealing cover and a second cover which forms a sealed space on the other side of the load sensor, and
wherein the sealing cover is sandwiched and held between the first and second covers.

(3) The tool according to (2),
wherein the sealing cover is integrated with a pressing part which is deformed by the pressing force through the switch manipulation part and which is configured to press the load sensor.

(4) The tool according to (3),
wherein the load sensor includes:
a pressure-sensitive conductive elastic member in which conductive particles are dispersed in a non-conductive elastic material; and
a substrate that is configured to conduct current by the pressure-sensitive conductive elastic member, and
wherein the pressure-sensitive conductive elastic member is attached to the substrate through the sealing cover.

(5) The tool according to (4),
wherein the load sensor is configured such that the substrate is sandwiched and held between the first and second covers, inside the sealing part.

(6) A tool comprising:
a switch that is configured to cause an electric component to operate; and
a handle that is held by a hand to manipulate the switch, wherein the switch includes:
a switch manipulation part to be manipulated;
a load sensor that is configured to receive a pressing force through the switch manipulation part;
a sealing cover that includes an elastic material which is deformed to press the load sensor when receiving the pressing force through the switch manipulation part and which is configured to be restored to an original shape thereof when the pressing force is released, and that is configured to cover the load sensor; and
a relieving part that is configured to relieve an increase in pressure of an internal space between the sealing cover and the load sensor as the sealing cover is deformed.

(7) The tool according to (6),
wherein the relieving part is configured such that a closed space is provided, and
wherein the closed space has a predetermined volume with respect to the internal space and is configured to allow air to flow between the closed space and the internal space.

(8) The tool according to (7),
wherein the relieving part includes a connecting portion which forms the closed space on the other side of the load sensor with respect the internal space which is formed on one side of the load sensor, and is configured to allow the internal space and the closed space to be connected with each other.

What is claimed is:
1. A tool comprising:
a switch that is configured to cause an electric component to operate; and
a handle that is held by a hand to manipulate the switch, wherein the switch includes:
a switch manipulation part to be manipulated;

a load sensor that is configured to receive a pressing force through the switch manipulation part, the load sensor including a pressure-sensitive conductive elastic member and a substrate;

a sealing cover that includes an elastic material which is deformable when receiving the pressing force through the switch manipulation part and which covers the load sensor, wherein the sealing cover includes a pressing part which is formed integrally with the sealing cover and which is configured to press the load sensor, wherein the pressing part includes a protrusion which protrudes in a direction toward the substrate, the sealing cover further including a seal part which includes a surface adjacent a side periphery of the substrate and which extends around and seals the side periphery of the substrate, and wherein the sealing cover further includes a flexible part which extends around the pressing part and which is integrally formed with the pressing part and the seal part, and the flexible part has a thickness smaller than a thickness of the pressing part and the seal part;

a preventing member which extends around the load sensor and which is configured to seal a region around the load sensor to seal an internal space located between the load sensor and the sealing cover, the preventing member including a supporting member;

wherein the supporting member supports the load sensor, and wherein the supporting member is on an opposite side of the load sensor with respect to the sealing cover, wherein an entire circumference of the load sensor is sealed by the sealing cover and the supporting member; and wherein the sealing cover further includes a support part which extends between the pressure-sensitive conductive elastic member and the substrate of the load sensor so as to form a space between the pressure-sensitive conductive elastic member and the substrate.

2. The tool according to claim 1,
wherein the preventing member includes a first cover which has an opening formed on one side of the load sensor, and the sealing cover is exposed through the opening of the first cover, and wherein the supporting member of the preventing member forms a second cover which forms a sealed space on the other side of the load sensor, and
wherein the sealing cover is sandwiched and held between the first and second covers.

3. The tool according to claim 2,
wherein:
the pressure-sensitive conductive elastic member includes conductive particles dispersed in a non-conductive elastic material; and
the substrate of the load sensor is configured to conduct current by the pressure-sensitive conductive elastic member, and
wherein the pressure-sensitive conductive elastic member is attached to the substrate through the sealing cover.

4. The tool according to claim 3,
wherein the load sensor is configured such that the substrate is sandwiched and held between the first and second covers.

5. The tool according to claim 2, wherein the switch manipulation part includes a convex portion protruding in a direction toward the load sensor, wherein the convex portion protrudes through the opening of the first cover and presses the sealing cover upon actuation of the switch manipulation part; and wherein the protrusion of the pressing part of the sealing cover is moved in a direction toward the substrate upon actuation of the switch manipulation part and pressing of the convex portion on the sealing cover.

6. The tool according to claim 1, wherein the preventing member includes a first cover, and wherein the first cover is sealed against the seal part.

7. The tool according to claim 6, wherein the supporting member includes a second cover and the second cover includes a sealing surface facing toward the seal part, and the seal part of the sealing cover includes a seal part surface facing toward the sealing surface of the second cover, and wherein the seal part surface of the sealing cover is in sealing contact with the sealing surface of the second cover.

8. The tool according to claim 7, wherein the first cover includes a sealing surface which faces toward and is in sealing contact with the sealing surface of the second cover, wherein the second cover is in sealing contact with both the first cover and the sealing cover with the sealing surface of the second cover in sealing contact with both the sealing surface of the first cover and the seal part surface of the sealing cover, and further wherein the sealing cover is in radial sealing contact the first cover with an outer periphery of the sealing cover in sealing contact with an inner periphery of the first cover.

9. The tool according to claim 8, wherein the second cover includes a closed space on an opposite side of the load sensor than the sealing cover forming a relieving part in communication with the internal space between the sealing cover and the load sensor to relieve pressure from the internal space.

10. The tool according to claim 6, wherein the first cover includes an opening which exposes the pressing part of the sealing cover.

11. The tool according to claim 1, wherein the supporting member is in contact with at least one of the substrate and an end surface of the seal part.

12. The tool according to claim 11, wherein the supporting member is in contact with both the substrate and the end surface of the seal part.

13. The tool according to claim 12, wherein the preventing member includes a first cover which partially covers the sealing cover, and wherein the supporting member is further in contact with a sealing surface of the first cover.

14. A tool comprising:
a switch that is configured to cause an electric component to operate; and
a handle that is held by a hand to manipulate the switch, wherein the switch includes:
a switch manipulation part to be manipulated;
a load sensor that is configured to receive a pressing force through the switch manipulation part, the load sensor including a substrate;
a sealing cover that includes an elastic material which is deformed to press the load sensor when receiving the pressing force through the switch manipulation part, which is configured to be restored to an original shape thereof when the pressing force is released, that is configured to cover the load sensor, and that is configured to seal the load sensor;
a load sensor support member positioned on an opposite side of the load sensor than the switch manipulation part, such that a first side of the load sensor faces toward the switch manipulation part and a second side of the load sensor, opposite the first side, faces toward the load sensor support member;

wherein an internal space having a volume is defined between the sealing cover and the load sensor on the first side of the load sensor, and as the sealing cover is deformed the volume of the internal space is changed; and a relieving part that is configured to relieve an increase in pressure of the internal space in accordance with the change of the volume of the internal space as the sealing cover is deformed, wherein the relieving part includes a closed space between the substrate of the load sensor and the load sensor support member on the second side of the load sensor, the closed space having a volume larger than the volume of the internal space, and the relieving part is configured to allow air to flow between the closed space on the second side of the load sensor and the internal space on the first side of the load sensor.

15. The tool according to claim 14,
wherein the relieving part includes a connecting portion which connects the closed space on the second side of the load sensor with respect the internal space which is formed on the first side of the load sensor.

16. The tool according to claim 14, wherein a cover on the second side of the load sensor provides the load sensor support member, the cover having the closed space therein such that the closed space is defined between the cover and the substrate of the load sensor.

17. The tool according to claim 16, wherein the substrate of the load sensor includes a connecting portion forming a passageway to provide communication between the internal space on the first side of the load sensor and the closed space on the second side of the load sensor.

18. The tool according to claim 16, further including:
a first cover which covers the sealing cover;
a second cover on the second side of the load sensor than the sealing cover, wherein the second cover provides the load sensor support member, wherein the relieving part is part of the second cover and includes the closed space therein which is in communication with the internal space between the sealing cover and the load sensor; and
wherein the second cover includes a sealing surface which is in sealing contact with at least one of the sealing cover and the first cover.

19. The tool according to claim 18, wherein the sealing surface of the second cover is in sealing contact with both the first cover and the sealing cover.

* * * * *